Sept. 29, 1959  B. R. BAGLEY  2,906,134
FABRICATED MULTIPLE-SHEAVE GROOVED PULLEY
Filed Oct. 24, 1957
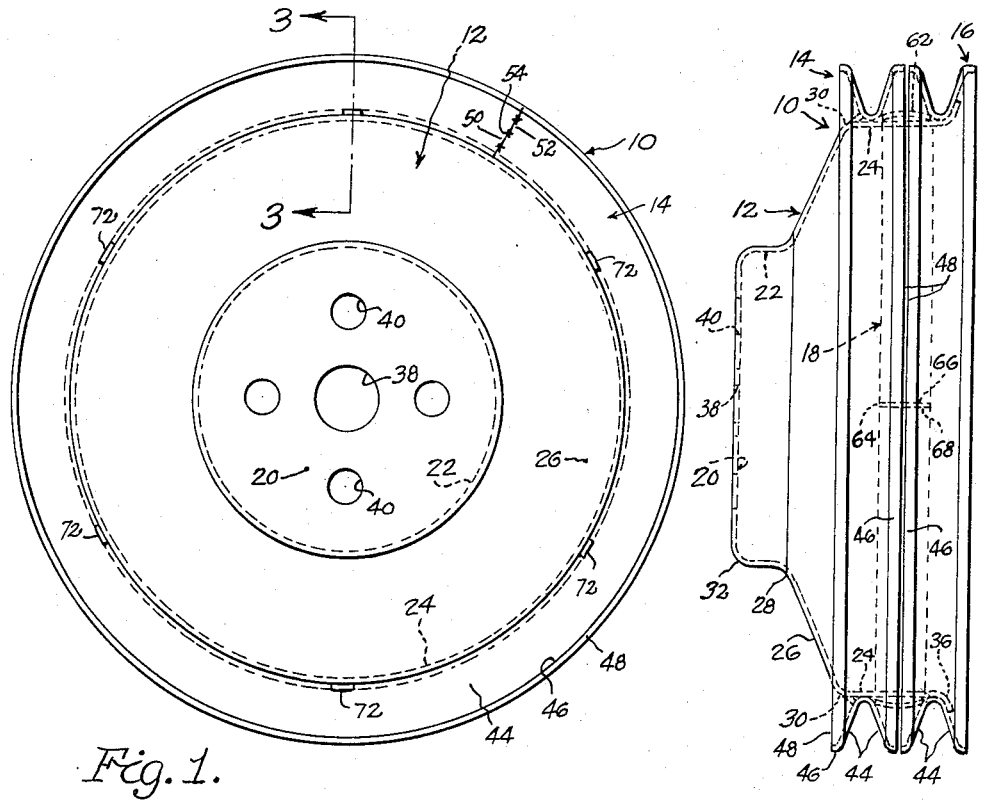
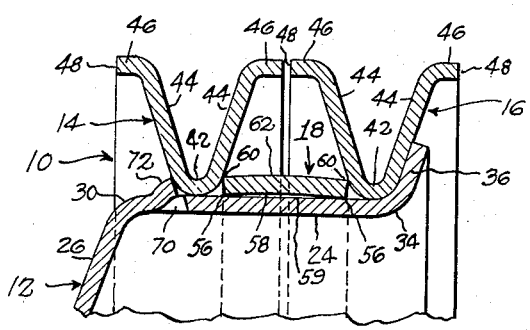
INVENTOR.
Bruce R. Bagley
BY Barthel + Bugbee
Attys

United States Patent Office 2,906,134
Patented Sept. 29, 1959

2,906,134

FABRICATED MULTIPLE-SHEAVE GROOVED PULLEY

Bruce R. Bagley, Detroit, Mich.

Application October 24, 1957, Serial No. 692,108

5 Claims. (Cl. 74—230.8)

This invention relates to pulleys and, in particular, to fabricated or built-up multiple-sheave pulleys.

In recent years, multiple-sheave pulleys have come into greatly increased use, particularly in the automotive industry, for driving not only the engine fan but also other accessories with which modern automobiles have been equipped, such as pumps, compressors and the like which are used for power steering, power braking and air conditioning installations. Such installations have been increasingly used in large numbers in recent years, and such use is greatly expanding. Multiple sheave pulleys have hitherto been difficult and expensive to manufacture as well as unsatisfactory in performance and operating life by reason of the fact that such a pulley which is sufficiently strong to withstand the severe stresses placed upon it during its operating life has hitherto required expensive design and construction characteristics. Fabricated multiple-sheave pulleys built up by welding together separate components have not been completely satisfactory, not only because they lack sufficient structural strength but also because it has hitherto not been possible or feasible during production to maintain the necessary close tolerances as to the dimensions and also the separations of the center lines of the sheaves.

The present invention provides an improved fabricated multiple sheave grooved pulley wherein the hub of the pulley is in the form of a cup-shaped sheet metal or die cast shell or stamping having an approximately cylindrical portion upon which the multiple sheaves are mounted, separated from one another by an approximately annular spacing member and then secured by any suitable means, such as by staking the outer sheave to the hub and against the spacing member, the inner sheave by the spacing member against the flange on the hub.

Accordingly, one object of this invention is to provide a fabricated multiple-sheave grooved pulley wherein the cup-shaped hub component is formed by stamping from sheet metal or by die casting in a separate operation from multiple sheaves, which are separately formed by stamping and secured to the hub in accurately-spaced relationship, thereby enabling the sheave to be made from inexpensive yet adequately strong and wear-resistant metal.

Another object is to provide a fabricated multiple-sheave grooved pulley of the foregoing character wherein the multiple sheaves are positioned and maintained in accurate locations by the use of an annular spacer placed between them, the sheaves themselves being secured firmly to the pulley hub, thereby enabling the use of exceptionally close manufacturing tolerances which are not feasible in prior fabricated multiple-sheave grooved pulleys.

Another object is to provide a fabricated multiple-sheave grooved pulley of the foregoing character wherein one of the multiple sheaves is held in position against a flange on the hub by the annular spacing member, against which the other sheave is held by a securing means, such as by staking, thereby enabling the multiple sheave to be held in position by a single securing operation upon one of the sheaves.

Another object is to provide a fabricated multiple-sheave groved pulley of the foregoing character wherein the annular spacing member does not require securing to the hub, but is in the form of a split ring forced against the hub by the pressure of one of the multiple sheaves against the other multiple sheave by a wedging action brought about by the V-shaped cross-sections of the sheaves.

Another object is to provide a fabricated multiple-sheave grooved pulley wherein each of the sheaves of V-shaped cross-section is provided at its bottom with a rounded groove, the radius of which is slightly greater than the thickness of the sheet metal from which the sheave is made, thereby preventing creasing of the metal and consequently preventing the formation of cracks resulting from the over-stressing of the metal in localized areas, such as is caused by sharp lines or angles of junction between the inwardly-converging side walls of the sheaves.

Other objects and advantages of the invention will become apparent during the course of the following description of the accompanying drawing, wherein:

Figure 1 is a front elevation of a fabricated multiple-sheave grooved pulley, according to one form of the invention;

Figure 2 is a side elevation of the pulley shown in Figure 1; and

Figure 3 is an enlarged fragmentary longitudinal section taken along the line 3—3 in Figure 1.

Referring to the drawings in detail, Figures 1 and 2 show a fabricated multiple-sheave grooved pulley, generally designated 10, as consisting generally of a central cup-shaped hub 12 upon the periphery of which a plurality of sheaves 14 and 16 are mounted side by side and spaced apart from one another by an annular spacing member 18. The hub 12 is in cup-shaped form, either by being stamped out of sheet metal or by being die cast from molten die casting metal. For purposes of illustration, the hub 12 in the drawings is shown as stamped out of sheet metal, such as by the use of suitable dies in a stamping press.

The hub 12 has a disc-shaped end wall 20 arranged substantially perpendicular to the axis of rotation of the pulley, approximately cylindrical central and peripheral walls 22 and 24, and an approximately conical or flared intermediate wall 26 extending between the inner edges 28 and 30 of the central and peripheral cylindrical portions 22 and 24 respectively. The outer and inner edges 32 and 28 of the central portion 22 and the inner edge 30 of the peripheral portion 24 are rounded in order to prevent the formation of overstressed areas which could result in cracking of the metal. The outer edge 34 of the peripheral cylindrical portion 24 is also rounded for the same purpose, and is provided with an outwardly-flared flange 36 (Figure 3) serving as a stop flange. The end wall 20 has a central hole 38 for the reception of the shaft (not shown) upon which it is to be mounted, and is also provided with a plurality of circumferentially-spaced outer holes 40 for the reception of fasteners, such as bolts or screws by which the pulley hub 12 is secured to a driving flange or hub (not shown).

The sheaves 14 and 16 are of similar construction and ordinarily though not necessarily of similar dimensions where they receive similar belts, hence a single description suffices for both. Each sheave 14 or 16 is preferably formed from an elongated strip of sheet metal, such as sheet steel, of sufficient length to extend around the peripheral cylindrical portion 24 of the hub 12, the opposite ends being welded together and the hollow cylinder thus formed being rolled or otherwise shaped into a channel member of approximately V-shaped cross-section with a rounded axially narrow bottom wall portion 42 (Figure 3), outwardly and oppositely-flared lateral wall portions 44, and axially-directed opposite edge flanges 46 terminating in annular radial end surfaces 48. The radial line of junction between the opposite ends 50 and 52 of the strip of sheet metal from which each sheave 14 or 16 is formed is indicated at 54 in Figure 1. In order to prevent the formation of creases with consequent danger of the formation of cracks as a result of overstressing localized areas of metal, the radius of the bottom wall portion or groove bottom 42 is preferably made slightly greater than the thickness of the sheet metal from which the sheaves 14 and 16 are formed. The flange 36 on the hub 12 is preferably directed at the same angle to the axis of rotation as the side wall portions 44 of the sheave 16 so as to form a snug fit such as a stretch fit therebetween, as shown in Figure 3. The inside diameters of the sheaves 14 and 16 are such as to fit snugly on the outer surface of the peripheral cylindrical portion 24.

The spacer 18 is mounted between the sheeaves 14 and 16 on the peripheral cylindrical portion 24 and consists of a band of sheet metal, such as sheet steel, of slightly arcuate cross-section so as to maintain a slightly arched relationship with the peripheral cylindrical portion 24 (Figure 3), such that the lower corner edges 56 of the lower arcuate surface 58 engage the outer surface 59 of the cylindrical portion 24 whereas the upper corner edges 60 of the upper arcuate surface 62 engage or are engaged by the outer surfaces of the flared portions 44 of the sheaves 14 and 16. The spacing member 18 is not continuous, but is in the form of a split ring with a gap 64 between its opposite ends 66 and 68 (Figure 2).

In assembling the pulley 10, the sheave 16 is first placed on the peripheral cylindrical portion 24, followed by the spacing member 18, and then the other sheave 14. The components of this assembly are snugly pushed together as shown in Figure 3, into firm abutting relationship with the flange 36 and with one another, whereupon the hub 12 is subjected to the action of a staking tool (not shown) at peripherally-spaced locations to stake the peripheral cylindrical portion 24 near its junction 30 with the conical portion 26, thereby providing identations 70 and outwardly-extending projections 72 engaging the adjacent flared wall 44 of the sheave 14 near its junction with its rounded bottom portion 42.

In operation, the pulley 10 is mounted on a pulley shaft (not shown) extending through the hole 38 and carrying a driving flange or driving hub (not shown) to which the pulley hub 12 is secured by fasteners, such as bolts or screws, inserted through the holes 40. The sheaves 14 and 16 receive V-belts by which they drive or are driven, as the case may be, in the usual manner. The edge flange 36 not only strengthens the hub 12 but also serves as an abutment for the sheave 16, as previously stated. The pushing together of the sheaves 14 and 16 during assembly, as stated above, compresses the spacing member or split ring 18 with a wedging action brought about by the inclined wall portions 44 against the corner edges 60, forming the spacing member 18 against the peripheral cylindrical portion 24 of the hub 12 with a constricting action, narrowing the gap 64 and maintaining a tight grip between the spacing member 18 and the hub 12.

It will be evident that while the invention has been described and illustrated in connection with a pulley having a pair of sheaves 14 and 16, it is also applicable to pulleys having three or more such sheaves. In such adaptations of the invention, the several sheaves are separated from one another by spacers 18 similar to that shown in the drawings herein, with the outermost sheaves holding the assembly in position upon the peripheral cylindrical wall 24 (elongated axially in order to accommodate the three or more sheaves and their spacers 18), and in turn held in position by the flange 36 at one end and by the staking projections 72 at the other end.

What I claim is:

1. A fabricated multiple-sheave grooved pulley comprising a cup-shaped metal hub having an approximately cylindrical peripheral wall and a disc-shaped end wall integral with said peripheral wall at one end thereof, said end wall having means thereon for attaching said hub to a rotary support; a pair of grooved annular one-piece sheet metal sheaves of approximately V-shaped cross-section having inclined side walls and axially-narrow bottom walls interconnecting said side walls at their places of nearest approach, said bottom walls being mounted snugly upon the exterior of said peripheral wall in axially-spaced relationship and said side walls diverging outwardly from said bottom walls, a spacing member mounted on the exterior of said peripheral wall between said sheaves in axial spacing engagement therewith, and means for securing said sheaves to said peripheral wall.

2. A fabricated multiple-sheave grooved pulley, according to claim 1, wherein the securing means includes an abutment flange on one end of said peripheral wall abuttingly engaged by one of said sheaves, said abutment flange being inclined similarly to the inclined side walls of the last-mentioned sheave.

3. A fabricated multiple-sheave grooved pulley, according to claim 2, wherein the securing means also includes protuberances projecting outward from said peripheral wall into abutting engagement with the other sheave, said protuberances urging said other sheave and said spacing member against the remaining sheave and consequently urging said remaining sheave against said abutment flange.

4. A fabricated multiple-sheave grooved pulley, according to claim 1, wherein the spacing member comprises an annular band having opposite edges engaging said sheaves adjacent the bottom walls of said sheaves.

5. A fabricated multi-sheave grooved pulley, comprising a cup-shaped metal hub having an approximately cylindrical peripheral wall and a disc-shaped end wall integral with said peripheral wall at one end thereof, said end wall having means thereon for attaching said hub to a rotary support; a pair of grooved annular one-piece sheet metal sheaves of approximately V-shaped cross-section mounted snugly upon the exterior of said peripheral wall in axially-spaced relationship, a spacing member mounted on the exterior of said peripheral wall between said sheaves in axial spacing engagement therewith, and means for securing said sheaves to said peripheral wall, said spacing member comprising an interrupted annular band of slightly arched cross-section having separate ends disposed adjacent one another.

References Cited in the file of this patent

UNITED STATES PATENTS

| | | |
|---|---|---|
| 2,008,003 | Feldbush | July 16, 1935 |
| 2,095,025 | Browning | Oct. 5, 1937 |
| 2,646,689 | Maher | July 28, 1953 |
| 2,787,914 | Nelson | Apr. 9, 1957 |